United States Patent [19]

Jeglic

[11] Patent Number: 4,778,615

[45] Date of Patent: Oct. 18, 1988

[54] COMPOSITION FOR TREATING PARTICULATE MATERIALS AND A METHOD FOR TREATING PARTICLES

[75] Inventor: Michael F. Jeglic, Bay City, Mich.

[73] Assignee: The Dow Chemical Company, Midland, Mich.

[21] Appl. No.: 905,608

[22] Filed: Sep. 9, 1986

[51] Int. Cl.$^4$ .............................................. C09K 3/18
[52] U.S. Cl. .................................... 252/70; 44/16 R; 44/601; 106/13; 252/74; 252/75
[58] Field of Search ............... 252/70, 74, 75; 106/13; 44/1 R, 6, 16 R

[56]  References Cited

U.S. PATENT DOCUMENTS

| | | | |
|---|---|---|---|
| 1,997,735 | 4/1935 | Lund | 252/74 |
| 3,310,494 | 3/1967 | Sproule | 252/70 |
| 4,094,805 | 6/1978 | Hansen | 252/70 |
| 4,117,214 | 9/1978 | Parks et al. | 252/70 |
| 4,254,166 | 3/1981 | Glanville et al. | 106/13 |
| 4,277,520 | 7/1981 | Inks et al. | 252/70 |
| 4,304,798 | 12/1981 | Clapp et al. | 252/70 |
| 4,338,359 | 7/1982 | Kestner | 252/70 |
| 4,388,203 | 6/1983 | Nimerick et al. | 252/70 |
| 4,410,599 | 10/1983 | Roe et al. | 252/70 |
| 4,439,337 | 3/1984 | Nimerick et al. | 252/70 |
| 4,501,775 | 2/1985 | Parks et al. | 252/70 |

*Primary Examiner*—Robert A. Wax
*Attorney, Agent, or Firm*—Philip P. Shepherd; Thomas A. Ladd

[57]  ABSTRACT

An inorganic halide and a water soluble hydroxy-containing organic compound or urea are useful in treating particulate solids such that the solids are more easily dumped after being exposed to freezing temperatures. The combination of the inorganic halide and hydroxy-containing organic compound or urea not only reduce the strength of ice formed between the particles but also reduce the amount of particulate solids which sticks to the sides of the transport or storage container from which the solids are removed.

16 Claims, No Drawings

COMPOSITION FOR TREATING PARTICULATE MATERIALS AND A METHOD FOR TREATING PARTICLES

BACKGROUND OF THE INVENTION

The present invention relates to a composition useful for reducing the strength of ice and to a method for treating frozen coal.

Many particulate materials such as coal are commonly stored or transported in open topped containers from which they must ultimately be removed. Any difficulty in readily and effectively removing the entire amount of the particulate material from the container represents a significant problem due to the time and trouble involved in overcoming impediments to such removal and the economic loss resulting in the event a significant portion of the material is not removed from the container.

In sub-freezing temperatures, the appreciable quantity of moisture commonly encountered in the storage and/or transporting of such particulate materials can hinder the efficient removal of the materials. Specifically, when the moisture on the particles freezes, the ice acts as powerful adhesive holding the particles together in a mass. It thus becomes difficult to unload or dump the particulate solid from the railway car, truck, or other transport container, thereby leaving a significant portion of the solid in the container. It also makes difficult the movement of coal from outdoor storage piles in a condition for fuel or other use. In addition, the moisture, upon freezing, causes the particulate material to freeze to the sides of the storage and/or transport container. This problem, often referred to as "slabbing", not only reduces the ability to effectively remove the particulate solid but can lead to derailments due to uneven weight distribution and high center of gravity.

Various techniques such as vibration, steam lances, fires under the railway cars, infrared heating in warming sheds and even dynamiting have been employed to heat or mechanically loosen the frozen particulate material. However, these techniques have only met with, at best, limited success due to their inherent safety problems, high costs and/or capital expense.

Other approaches which have been employed to reduce the problems associated with frozen coal include the use of chemicals which reduce the freezing point and/or the strength of ice. For example, salts such as sodium chloride and calcium chloride have been added to the moist coal as it is being loaded, i.e., prior to freezing, to reduce the freezing point of water. Unfortunately, relatively high concentrations of the salts have been taught as being necessary for effective performance. Although the salt, if added in sufficiently high concentrations and in the proper manner, will reduce the effects of frozen coal in dumping or unloading operations, its addition has not been found to substantially reduce the problems associated with the freezing of coal to the side walls of the transport or storage container. In addition, it has long been felt that the salts will cause significant corrosion problems.

Alternatively, oil has been added to the particulate material, preferably upon loading, with questionable success to "freeze proof" the particles. Oil soluble surfactants have also been used in combination with the oil with questionable results. Ethylene glycol, propylene glycol or a mixture thereof has also been employed to reduce the problems associated with the freezing of the particulate solids. Unfortunately, the amount of glycol required to reduce the freezing point of the resulting water/glycol solution by even a few degrees high is relatively large. Therefore, treatment using glycol can be costly and, in some cases, uneconomical. Moreover, the use of ethylene glycol and/or oils does not substantially reduce the slabbing or the freezing of the coal to the side walls of the transport or storage container.

A chemical composition, commonly referred to as a "freeze conditioning agent", which has been shown to be useful in reducing problems associated with frozen particulate solids is a composition of a water-soluble polyhydroxy compound or monoalkylether thereof and a water soluble organic nonvolatile compound such as sodium acetate. (See, for example U.S. Pat. Nos. 4,117,214 and 4,501,775). Such freeze conditioning compositions reduce the physical strength of ice, thereby facilitating the unloading and/or dumping of the treated particulate solid at freezing conditions. An equivalent freeze conditioning composition of the combination of a non- or slightly ionizing water-soluble organic compound such as a polyol and a compound containing an ammonium ion is described in U.S. Pat. No. 4,254,166. Although these freeze conditioning agents are very effective in reducing the problems associated with freezing of moisture, the higher amounts of moisture often encountered toward the outer portions of the transport and/or storage container dilutes their effect, thereby rendering the disclosed freeze conditioning agents less effective in this portion and requiring the use of additional means to fully remove the particulate materials from the container.

A thickened aqueous solution of a water-soluble polyhydroxy compound or monoalkylether thereof, a water-soluble organic nonvolatile compound and/or an inorganic salt is taught to be useful in thawing ice in U.S. Pat. No. 4,388,203. The thickener is added to the aqueous solution to increase the viscosity and tackiness of the composition sufficiently to maintain an essentially even coating of the composition when applied to a frozen surface. The preferred compositions contain both the water-soluble organic non-volatile compounds and the inorganic salt.

To reduce the problems associated with the particulate solids adhering to the side walls of the transport and/or storage containers, it has become a common practice to apply a chemical composition, often referred to as a "side release agent" to the containers prior to loading. The side release agents from a boundary between the ice and the side walls and allows the slabs of material to fall from the container during normal dumping. A representative side release agent is brine containing small amounts (i.e., up to 3 weight percent) of a polymeric ethylene oxide component of a molecular weight between 100,000 and 600,000 as described by U.S. Pat. No. 4,410,599. An alternative side release agent is disclosed in U.S. Pat. No. 4,338,359 as being a water solution of an inorganic freeze point depressant, e.g., calcium chloride, and a thickening agent, e.g., various methyl cellulose derivatives. Unfortunately, the use of side release agents is not often economical. In addition, except on short haul, captive rail car conditions, regardless of the effectiveness of the known side release agents on reducing the adhesion of the frozen slabs of material to the side walls, the use of a side release agent does not eliminate the need for the use of a freeze conditioning agent to prevent the bulk of particulate material from freezing into a single solid mass.

SUMMARY OF THE INVENTION

The present invention, in one aspect, is a composition comprising from 35 to 65 weight percent water from 15 to 35 weight percent of an inorganic halide from 10 to 30 weight percent of a water soluble or water miscible hydroxy-containing compound, urea or mixture thereof, with the proviso that the composition contains no other water-soluble organic compound which functions to lower the freezing point of water or to terminate ice crystal growth.

The described composition is useful in treating moist particulate materials which may substantially be subjected to freezing temperatures. In particular, the composition is capable of effectively reducing the problem associated with the agglomeration of the bulk of the particulate material into one or more large masses due to the freezing of the surface moisture surrounding the individual particles. In addition, the composition has also been found capable of reducing the problem associated with slabbing and the adherence of the particulate material to the side wall of a transport or storage container even though the composition is applied directly to the particulate solid rather than the sides of the container as is normal when applying a side release agent. Therefore, using the described composition, particulate solids can effectively be removed from a rail car or other container without the need for both a freeze conditioning agent and a side release agent.

In another aspect, the present invention is a method for facilitating the discharge of particulate material from a container which method comprises spraying the particulate solids prior to or simultaneously with the introduction of the solids in the container (i.e. prior to freezing of the solids) with a composition comprising from 40 to 80 weight percent of an inorganic halide and from 20 to 60 weight percent of a water soluble or water miscible hydroxy-containing compound, urea or mixture thereof, based on the weight of the inorganic halide and the urea, hydroxy-containing organic compound or mixture thereof. Preferably, the composition contains no other water-soluble organic compound which functions to lower the freezing point of water or to terminate ice crystal growth other than the hydroxy-containing compound and/or urea. The composition employed in treating the particulate solids will preferably further comprise water in an amount such that the composition comprises from 35 to 65 weight percent water, from 15 to 35 weight percent of the inorganic halide and from 10 to 30 weight percent of the hydroxy-containing compound, urea or mixture thereof.

In yet another aspect, the present invention is a method for treating water such that when frozen the resulting mass is physically weaker than water frozen at the same conditions which has not been so treated. Specifically, the method comprises dissolving an effective amount of a composition comprising from 40 to 80 weight percent of an inorganic halide and from 20 to 60 weight percent of a water soluble or water miscible hydroxy-containing compound, urea or mixture thereof; which composition contains no other water-soluble organic compound which functions to lower the freezing point of water or to terminate ice crystal growth other than the hydroxy-containing compound and/or urea.

In still another aspect, the present invention is a method for treating water insoluble particulate solids having surface moisture to reduce the cohesive strength of masses of such solids when frozen, said method consisting of spraying the particulate solids with an effective amount of the described composition.

DETAILED DESCRIPTION OF THE INVENTION

The composition of the present invention comprises water, an inorganic halide and a water soluble or water miscible hydroxy-containing compound, urea or mixture thereof. Preferably, the composition is an aqueous solution consisting essentially of the inorganic halide and a hydroxy-containing organic compund or urea, preferably a hydroxy-containing compound.

The inorganic haide is advantageously an ammonium, alkali metal or alkaline earth metal halide. Such compounds can be represented by the formula $M(X)_n$ wherein M is ammonium, an alkali metal or an alkaline earth metal, X is a halogen and is is the valence of M. Advantageously, M is ammonium, potassium, sodium, calcium or magnesium and X is chlorine or bromine. Preferably, the halide is sodium chloride (NaC), potassium chloride (KCl), calcium chloride ($CaCl_2$), magnesium chloride ($MgCl_2$); and calcium bromide ($CaBr_2$). More preferably, the halide is calcium chloride, calcium bromide, or magnesium chloride, with calcium chloride being most preferred.

The water soluble or water miscible hydroxy-containing compounds, which term includes compounds such as the water soluble or water miscible monoalkylethers of polyhydroxy compounds, is capable of forming a mixture with water which mixture appears as a uniformly dispersed or homogeneous liquid under visual inspection without magnification. These mixtures include (1) true solutions in which individual molecules of the organic material are dispersed in water and (2) micellular or colloidal solutions wherein the molecules of the organic material are aggregated to some extent but wherein the aggregates are no larger than colloidal size. Preferably, the organic compound forms at least a 10, more preferably a 20, weight percent solution water.

Although compounds containing a single hydroxy group such as methanol, ethanol or isopropanol can be employed as the water soluble hydroxy-containing compound, the hydroxy-containing compounds advantageously employed herein are polyhydroxy compounds. Preferred polyhydroxy compounds are the polyhydroxyalkanes such as ethylene glycol, diethylene glycol, triethylene glycol, tetraethylene glycol, propylene glycol, dipropylene glycol, tripropylene glycol, tetrapropylene glycol, pentapropylene glycol, hexylene glycol, glycerine and sugar. Monoalkylethers of such compounds such as monobutylether of ethylene glycol can also be employed herein. More preferred polyhydroxy compounds are ethylene glycol, poly(ethylene glycol)propylene glycol and poly(propylene glycol), wherein the term "poly" means 2 or more but generally less than 8, preferably less than 6. In general, poly(ethylene glycol) and poly(propylene glycol) are the most preferred hydroxy-containing compounds.

Mixtures of two or more polhydroxyalkanes, mixtures of one or more polyhydroxyalkanes with a monohydroxy compound, a monoalkylether of a polyhydroxy compound or urea can also be preferably employed.

The inorganic halide is employed in an amount from 40 to 80 weight percent and the hydroxy-containing organic compound, urea or mixture thereof (hereinafter referred to as the "organic component" is employed in an amount from 20 to 60 weight percent of the organic component, said amounts being based on the weight of the inorganic halide and the organic component. Preferably, the inorganic halide is employed in an amount of from 50 to 70 weight percent and the hydroxy-containing organic compound in an amount of from 30 to 50 weight percent based on the weight of the two components.

When employing the inorganic halide and the organic component treating particulate solids or in reducing the strength of ice, the halide and organic component can be applied neat (i.e., without water or other diluent) to the particulate material or the water being treated. However, the halide and the organic component are generally more preferably mixed with water prior to their use and the composition of this invention is such an aqueous solution comprising from 35 to 65 weight percent water, from 15 to 35 weight percent of the inorganic halide and from 10 to 30 weight percent of the organic component. Preferably the composition of the present invention will comprise from 40 to 65, more preferably from 45 to 60, weight percent water, from 20 to 35, more preferably from 22 to 32, weight percent of the inorganic halide and from 11 to 28, more preferably from 12 to 25, weight percent of the organic component. Although the aqueous solution of the inorganic halide and organic component can be diluted prior to use form a solution having a lower solids content than specified, in general, such dilution is generally not required or desired.

The composition and method of the present invention are useful with all forms of particulate solids which are or will become wet or moist. Typical of such materials are coal and mineral ores such as iron and copper ore. Many of these materials are processed (e.g., cleaned) using water and retain surface moisture. In addition, these materials are commonly stored in piles exposed to the atmosphere and transported in railroad cars or trucks open to the environment. Thus, they are exposed to rain and the other elements where they can collect surface moisture. When the temperature drops below freezing, the particles are bound together by the ice formed at the particle surfaces and between the particles and the walls of the transport container.

The amount of material used in treating water or particulate solids can vary over a wide range. Specific amounts most advantageously employed in the practice of the present invention will vary depending on a variety of factors including the specific end-use applications; the specific inorganic halide and organic component employed; and the method of application (e.g., if applied as an aqueous solution, the concentration of the inorganic halide and organic component in solution). In treating particulate solids, the particle size of the solid particles, the amount of moisture and the condition of exposure of the particles should also be considered. The inorganic halide and organic component are generally advantageously employed in that minimum amount which proves effective for a particular end-use application which amount is easily determined by simple experimentation. In general, the amount of material (dry weight basis) used will vary from about 0.25 to about 5 weight percent based on the total weight of the moisture being treated. In treating particulate solids, on a dry weight basis, the mixture of the inorganic halide and organic component is generally advantageously applied to the particulate solids in an amount from about 0.05 to about 0.4 weight percent based on the total weight of the particulate solids being treated. Preferably, from about 0.06 to about 0.3, more preferably from about 0.07 to about 0.25, weight percent of the mixture, on a dry weight basis, is applied to the particulate solids being treated.

The composition of the present invention or employed in the practice of the present invention preferably do not contain additional organic materials which function to lower the freezing point of water or which terminate ice crystal growth. For example, organic materials containing at least one hydrophilic group such as amine, carboxyl or carboxylate groups which are conventionally employed in other freeze conditioning compositions are preferably not contained in the composition of the present invention. However, the composition of the present invention or employed in the practice of the present invention can contain materials such as dyes and colorants, stabilizers, antioxidants and the like which do not have a substantial effect on the freezing point of water or the ice crystal termination. In general, it is preferable if any such materials are water soluble. In addition, the compositions of the present invention or employed in the practice of the present invention do not require thickening to be effective and the preferred compositions contain no thickening agents.

In the practice of the present invention, in treating water, the inorganic halide and the organic component can be added to the water being treated, either as a mixture, e.g., in aqueous solution, or individually, and dissolved in the treated water. Once frozen, the water will exhibit a reduced strength and be more easily broken. The method of the present invention will more commonly be employed in treating particulate solids. In such method, the inorganic halide and organic component, preferably as an aqueous solution, are mixed with the particulate solids, prior to freezing of the solids, using any of a variety of techniques, preferably techniques which cause the inorganic halide and the organic component to intimately contact the particles. For example, one or more spray bars or rods for spraying the inorganic halide and organic component can be placed above and/or below the discharge end of a loading conveyor. As the particulate solid tumble off the conveyor, the inorganic halide and organic component are sprayed onto the particles.

The following examples are included to illustrate the invention only and should not be construed to limit its scope. Unless otherwise indicated, all parts and percentages are by weight.

EXAMPLE 1

To demonstrate the effectiveness of the present invention in reducing the compressive strength of a frozen particulate mass, 400 grams of moist silica sand having a particle size of greater than 20 mesh and less than 40 mesh (U.S. Standard) is treated with 2 grams of an aqueous solution containing 30 weight percent calcium chloride and 25 weight percent of polypropylene glycol having an average molecular weight of 250. The resulting treated material is placed in a plexiglas cylinder having an internal diameter of 7 centimeters (cm) and a height of 21 cm. The walls of the cylinder have previously been sprayed with a mold release agent. The moist an sand treated with the inorganic halide and organic component is compacted using a load equivalent to about 0.1 atmosphere and is placed in a freezer maintained at about $-20°$ C. for 16 hours. The frozen sample is then removed from the cylinder and broken by dropping a 1.4 kilogram weight onto a driving ram which rests on top of the block. The velocity of the weight is is 2.94 meters per second upon impact. The dynamic forces during impact, the pressure build-up and the failure of the frozen sample are measured during the testing.

Using the same techniques, the compressive strengths of a number of frozen silica blocks which are treated with a series of aqueous solutions containing from 22.5 to 31 percent calcium chloride, 10 to 25 weight percent polypropylene glycol and 45 to 61.7 percent water are determined.

For purposes of comparison, the compressive strength of a frozen silica block which has not been treated is also determined. In addition, the compressive strength of a frozen silica block treated with a 30 percent aqueous solution of calcium chloride and the compressive strength of a frozen silica block treated with an aqueous solution of 65 percent ethylene glycol and 5 percent sodium acetate are also determined.

The frozen silica blocks which have been treated in accordance with the present invention exhibit at least 50 percent reduction in compressive strength as compared to the frozen block which was not treated. The compressive strengths of the blocks treated with the inorganic halide and organic component are found to be similar to the compressive strengths of the blocks treated with the $CaCl_2$ solution and the solution of ethylene glycol and sodium acetate.

EXAMPLE 2

To demonstrate the effectiveness of the present invention in unloading cars of coal in sub-freezing temperatures, for an extended period of time during the winter of 1985 to 1982, 2 inch×0 processed coal (Coal Sample A) containing, on the average, about 6 weight percent moisture was treated with an aqueous solution of 27.5 weight percent of calcium chloride and 25 weight percent of polypropylene glycol comprised mainly of tetrapropylene glycol (designated as M900). The thus treated coal was loaded into rail cars and shipped for twenty-four hours to a power station and unloaded using conventional rotary dump techniques. The amount of coal in each of the rail cars after dumping is measured. The average amount of coal remaining after dumping in each car is set forth in the accompanying Table. In addition, the number of cars which required redumping or which needed spraying with $CaCl_2$ to remove the coal from the sides of the car is also set forth in the Table.

Another sample of 2 inch×0 processed coal (Coal Sample B) containing, on the average, about 5 to 6 weight percent moisture was also treated with M900. The thus treated coal was loaded into rail cars and shipped for sixty hours to a power station and unloading using conventional techniques. The amount of coal in each of the rail cars after dumping is measured. The average amount of coal remaining after dumping in each car is set forth in the accompanying Table. In addition, the number of cars which required redumping or which needed spraying with $CaCl_2$ to remove the coal from the sides of the car is also set forth in the accompanying Table.

For purposes of comparison, the average amount of coal remaining after dumping per car, the number of cars which required redumping or which needed spraying with $CaCl_2$ to remove the coal from the sides of the car for the 1983–1984 season is also set forth in the Table for a sample of 2 inch×0 sized coal (Coal Sample C) which had been treated using an aqueous solution of 4.1 percent of sodium acetate, 65 percent ethylene glycol (designated as M257). This coal contained about 6.5 weight percent moisture on the average and was transported for sixty hours prior to dumping. The average amount of coal remaining after dumping per car, the number of cars which required redumping or which needed spraying with $CaCl_2$ to remove the coal from the sides of the car for the same during the 1982–1983 season is also set forth in the accompanying Table. During that season, the coal was treated using an aqueous solution of 5 percent sodium acetate, 40 percent ethylene glycol and 40 percent propylene glycol (designated as M185). Raw coal showed similar results to the sized coal during the 82–83 and 83–84 season.

TABLE

| Season | Coal Sample | Conditioner | No. of Cars Observed | Coal in Cars After Dumping Tons | Cars Redumped, % | Cars Jetted with $CaCl_2$, % |
|---|---|---|---|---|---|---|
| 85–86 | A | M900 | 1562 | 0.36 | 0 | 0 |
| 85–86 | B | M900 | 2439 | — | 0 | 0 |
| 83–84[1] | C | M257 | 7224 | 0.91 | 16.2 | 7.6 |
| 82–83[1] | C | M185 | 5553 | 0.47 | 3.3 | 2.6 |

[1]Not an example of this invention

Although conditions of each winter (season) are different and the terminology changed somewhat over the reported years, as evidenced by the data set forth in the foregoing Table, the composition and method of the present invention were effective in conditioning the coal such that it could be effectively dumped from the car. The fact that no cars required redumping or jetting with $CaCl_2$ is exceptional.

EXAMPLE 3

To determine the corrosive effect of the inorganic halide/organic component, a 1018 carbon steel coupon is placed in a container of minus 0.25 inch Blue Gem coal having an adjusted moisture content of 8 weight percent. To the coal is added 0.13 percent, based on the weight of the wet coal of an aqueous solution of 30 percent calcium chloride and 25 percent of polypropylene glycol. The container of the thus treated coal is placed in a freezer set at $-15°$ C. The corrosion rate in mils per year is calculated at the end of one, two and three month intervals and found to average about 0.03 mil/year. When repeated except that the steel coupon/coal is expressed to 20° C., the corrosion rate is found to average 0.22 mil/year.

When identical tests are conducted except that the aqueous solution of calcium chloride and ethylene glycol are not added to the coal, the corrosion rate averages about 0.024 mil/year at $-15°$ C. and about 0.175 mil/year at 20° C.

When the tests are repeated using a metal coupon having a bead of weld placed across the face of the coupon, the corrosion rate of the coupon at $-15°$ C. is about 0.03 mils/year and at 20° C. at about 0.24 mil/year when the coupon is exposed to coal containing the aqueous solution of calcium chloride and ethylene glycol and is about 0.03 mil/year at $-15°$ C. and about 0.195 mil/year at 20° C. when the coupon is exposed to the wet coal without the aqueous solution being present.

The differences between the corrosion rates of the moist coal without the aqueous solution of calcium chloride and ethylene glycol being present and those with the calcium chloride and ethylene glycol being present are not considered to be detrimental to the performance of the composition or method of the present invention in commercial application.

The addition of inhibitors to the aqueous solution of the calcium chloride and the ethylene glycol did not appreciably lower the corrosion rate of the solution and, in some instances, actually increased the corrosion rate.

What is claimed is:

1. A composition consisting essentially of from 35 to 65 weight percent water, from 15 to 35 weight percent of an inorganic halide and from 10 to 30 weight percent of a water soluble or water miscible hydroxy-containing compound selected from the group consisting of ethylene glycol, propylene glycol, poly(ethylene glycol) or poly(propylene glycol) wherein poly means from 2 to 8; a monoalkylether of ethylene glycol, propylene glycol, poly(ethylene glycol), or poly(propylene glycol); hexylene glycol; urea; sugar; and a mixture thereof.

2. The composition of claim 1 wherein the inorganic halide is represented by the formula $M(X)_n$ wherein M is ammonium, an alkali metal or alkaline earth metal, X is a halogen and n is the valence of M.

3. The composition of claim 2 wherein M is ammonium, potassium, sodium, calcium or magnesium and X is chlorine or bromine.

4. The composition of claim 1 wherein the water miscible or water soluble hydroxy-containing organic compound is a polyhydroxy compound or the monoalkylether thereof.

5. The composition of claim 4 wherein the hydroxy-containing organic component is ethylene glycol, diethylene glycol, triethylene glycol, tetraethylene glycol, propylene glycol, dipropylene glycol, tripropylene, glycol, tetrapropylene glycol, pentapropylene glycol, or hexylene glycol.

6. The composition of claim 4 wherein the hydroxy-containing organic component is ethylene glycol, poly(ethylene glycol), propylene glycol, or poly(propylene glycol), wherein poly means 2 or more but less than 6.

7. The composition of claim 4 wherein the polyhydroxy compound is polyethylene glycol or polypropylene glycol and the inorganic halide is calcium chloride, magnesium chloride or calcium bromide.

8. A method for facilitating the discharge of particulate solids which have been exposed to low temperatures from a container which method comprises treating the particulate solids prior to or simultaneous with the introduction of the solids to the container with a composition comprising from 40 to 80 weight percent of an inorganic halide and from 20 to 60 weight percent of a water soluble or water miscible hydroxy-containing compound, urea or a mixture thereof.

9. The method of claim 8 wherein the composition contains no other water-soluble organic compound which functions to lower the freezing point of water or to terminate ice crystal growth other than the hydroxy-containing compound and/or urea.

10. The method of claim 9 wherein the composition employed in treating the particulate solids further comprises water and the composition comprises from 35 to 65 weight percent water, from 15 to 35 weight percent of the inorganic halide and from 10 to 30 weight percent of the hydroxy-containing organic compound.

11. The method of claim 10 wherein the composition (dry weight basis) is applied to the particulate solids in an amount from about 0.05 to about 0.4 weight percent based on the weight of the particulate solids.

12. A method for treating water such that when frozen the resulting mass is physically weaker than water frozen at the same conditions which has not been so treated which method comprises dissolving in the water an effective amount of a composition comprising from 40 to 80 weight percent of an inorganic halide and from 20 to 60 weight percent of a water soluble or water miscible hydroxy-containing compound, urea or a mixture thereof.

13. The method of claim 14 wherein the composition contains no other water-soluble organic compound which functions to lower the freezing point of water or to terminate ice crystal growth other than the hydroxy-containing compound and/or urea.

14. A method for treating water insoluble particulate solids having surface moisture to reduce the cohesive strength of masses of such solids when frozen, said method comprising applying an effective amount of a composition comprising from 40 to 80 weight percent of an inorganic halide and from 20 to 60 weight percent of a water soluble or water miscible hydroxy-containing compound, urea or a mixture thereof onto the particulate solids.

15. The method of claim 8 wherein the water soluble or water miscible hydroxy-containing compound is selected from the group consisting of ethylene glycol, propylene glycol, poly(ethylene glycol), or poly(propylene glycol) wherein poly means from 2 to 8; a monoalkylether of ethylene glycol, propylene glycol, poly(ethylene glycol) or poly(propylene glycol); hexylene glycol; urea, sugar; and a mixture thereof.

16. The method of claim 14 wherein the water soluble or water miscible hydroxy-containing compound is selected from the group consisting of ethylene glycol, propylene glycol, poly(ethylene glycol) or poly(propylene glycol) wherein poly means from 2 to 8; a monoalkylether of ethylene glycol, propylene glycol, poly(ethylene glycol), or poly(propylene glycol); hexylene glycol; urea; sugar, and a mixture thereof.

* * * * *